W. A. JOHNSON.
BUG EXTERMINATOR.
APPLICATION FILED SEPT. 28, 1920.
1,415,358.
Patented May 9, 1922.
3 SHEETS—SHEET 3.
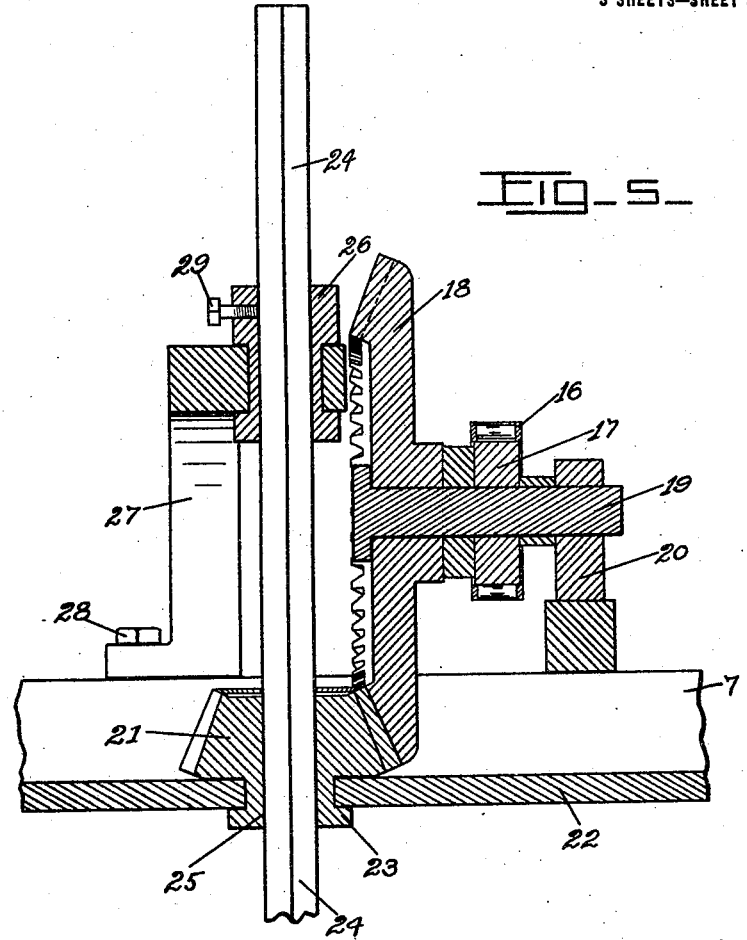
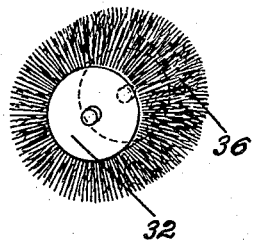
Inventor
WALTER A. JOHNSON
By A. E. Carlsen.
Attorney

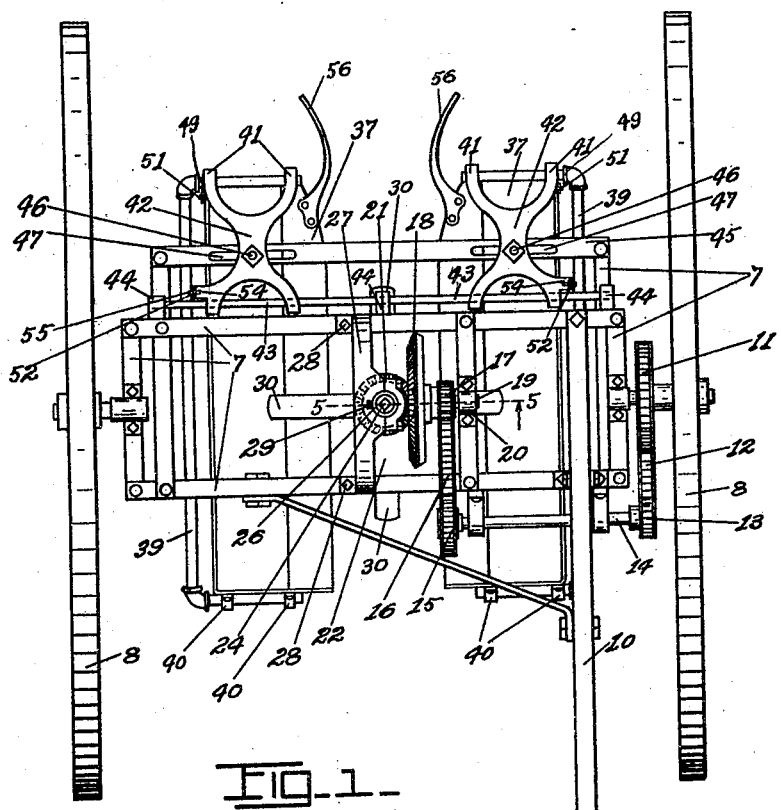

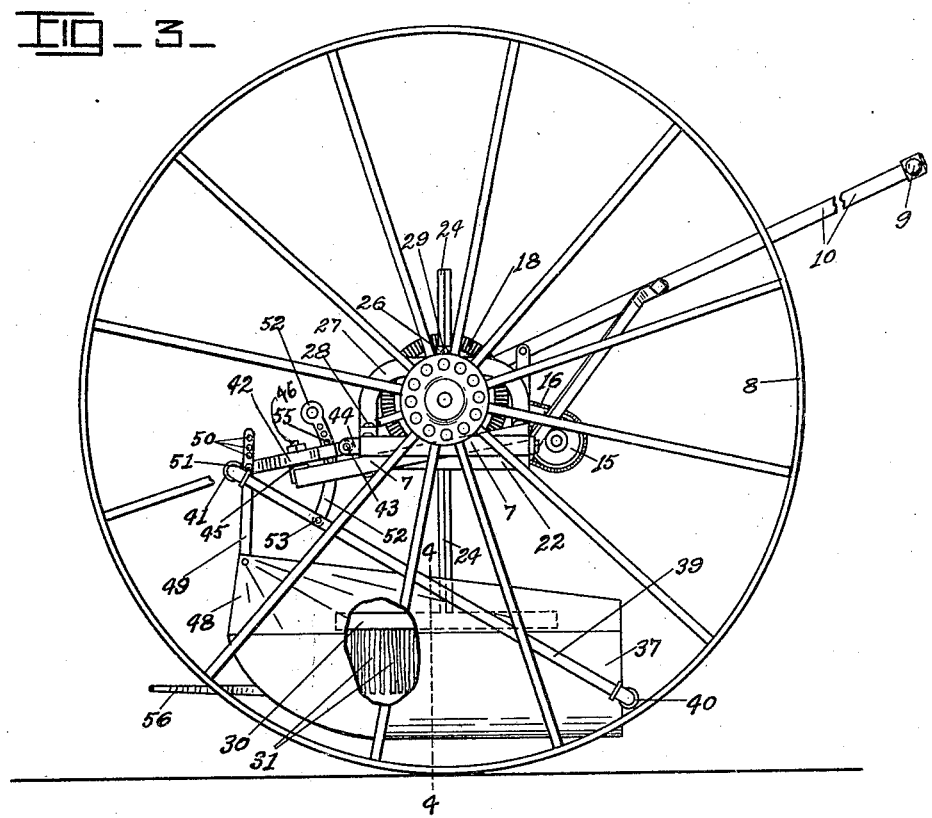

UNITED STATES PATENT OFFICE.

WALTER A. JOHNSON, OF ROCHESTER, MINNESOTA, ASSIGNOR TO PIONEER MANUFACTURING COMPANY, OF ALBERT LEA, MINNESOTA, A CORPORATION OF MINNESOTA.

BUG EXTERMINATOR.

1,415,358.  Specification of Letters Patent.  Patented May 9, 1922.

Application filed September 28, 1920. Serial No. 413,405.

*To all whom it may concern:*

Be it known that I, WALTER A. JOHNSON, a citizen of the United States, residing at Rochester, in the county of Olmsted and State of Minnesota, have invented certain new and useful Improvements in Bug Exterminators, of which the following is a specification.

This invention relates to potato bug destroyers and the main object is to provide a practical machine for gathering and killing potato bugs and other similar insects in an efficient and speedy manner. Further objects will be disclosed in the course of the specification. The machine embodying the principles of my invention is clearly illustrated in the accompanying drawings, in which:

Fig. 1 is a top or plan view of the machine, with a few of the parts omitted.

Fig. 2 is a detail sectional view showing one of the preferred construction of plant rappers.

Fig. 3 is a side view of the machine.

Fig. 4 is a detail sectional view on the line 4—4 in Fig. 3, showing the relative positions of the ground wheels, receiving pans and rappers.

Fig. 5 is an enlarged fragmental section on the line 5—5 in Fig. 1.

Fig. 6 shows in perspective, a modified form of roller which may be used in the rapper frame.

Subject matter of this invention as hereinafter claimed is also disclosed in a patent application filed by me on November 29th, 1920, for potato bug exterminator, Ser. No. 427,099, allowed October 24th, 1921.

Referring to the drawings by reference numerals, 7 designates a main frame which is supported on two suitable ground wheels 8. The machine as shown is pushed by a handle piece 9 on a shaft 10 secured to the frame, but it is understood that it may be so constructed that it may be propelled by either horses or tractor if so desired.

Fixed to the hub of one of the wheels 8 is a sprocket gear 11 which by means of a sprocket chain 12 drives a pinion 13 fixed on a countershaft 14. Said shaft 14 is suitably journaled on the frame 7 and has at its other end a sprocket gear 15 which by a chain 16 drives a pinion 17. The pinion 17, and a bevel gear 18 to which it is rigid, both rotate on a stud shaft 19 which is fixed in a suitable bracket 20 on the main frame. The bevel gear 18 meshes with a bevel pinion 21, which is journaled in a plate 22 on the frame (see Fig. 5) where it is retained in its proper position by a flange 23.

A vertically disposed square bar 24 is slidably positioned in a square hole 25 in the bevel pinion 21. The bar 24 is further supported and retained in vertical position by being similarly slidably guided in a bearing member 26 which is rotatably retained in a bracket 27 which is fixed on the main frame by bolts 28. A set screw 29 in the member 26 serves to secure the bar 24 in any vertical position desired.

The lower end of the bar 24 is provided with a rapper frame consisting of a number of radially extending horizontal arms 30 and a downwardly projecting arm 30$^a$. Said frame and arms are subject to a number of modifications, each of which is particularly adapted to be used under various circumstances and upon plants in their successive stages of growth. Thus in Figures 3 and 4 is shown a rapper frame each arm 30 of which is provided with a number of lashes 31 suspended therefrom, this form being especially adapted for use on full grown plants. In Fig. 2 is shown a rapper frame in which is journaled a roller 32 under each arm 30; each of said rollers being provided with longitudinally positioned rows of lashes 33. Adjacent the outer end of each of these rollers 32 is a spring member 34 which is secured at its end to the frame 30 and which yieldingly presses with its lower end against the roller preventing it from rotating too fast when the machine is in operation. The pressure of these springs 34 against the rollers 32 is suitably regulated by set screws 35. This structure as shown in Fig. 2 is found to be especially adaptable for removing bugs from plants of medium growth. For removing bugs from very young plants, a frame similar to that shown in Figure 2 is used but the rollers 32 are preferably provided with brush bristles 36, instead of the lashes 33.

Suspended near the side of the rapper frame and extending partly thereunder, are two receiving pans 37, each of which contains a suitable amount of poisonous liquid 38 such as kerosene, Paris green or turpentine. The rear ends of the pans 37 are suspended by inclined pipe hangers 39 which are pivotally secured at their lower ends at 40 to the pans and at their upper ends are swingingly secured at 41 in adjusting members 42. Said members 42 are at their opposite ends slidably secured on a rod 43 which is secured to the main frame 7 by suitable brackets 44. The members 42 are slidably supported on an angle iron 45, secured to the frame 7, and have bolts 46 adapted to engage in slots 47 in said angle iron, this enables said members 42 to be transversely adjusted and secured in any position on the machine desired; it being obvious that when such adjustments are made corresponding movements of the pans 37 to and from each other are also affected. The front ends of the pans 37 may be suspended in any suitable manner, a preferred way being illustrated in Fig. 3. In this view is shown an inwardly projecting apron 48, which may or may not be used as found necessary under various conditions. To the front end of this apron is secured a flexible strap 49 having a series of perforations 50 in its upper end, any of which may be buttoned over a stud 51 on the members 42, thus enabling the height of the front ends of the pans 37 to be adjusted.

The rear ends of the pans are adjusted vertically by means of segments 52 which are pivotally connected at 53 at their lower end to the hangers 39. Said segments are slidable in projections 54 of the members 42 and are provided with perforations adapted to be engaged by pins 55.

With the pan supporting devices thus described, it is obvious that either or both ends of the pans may be vertically adjusted as desired, and will provide means whereby they may yield upwardly when passing over bumps or high places on the ground.

In the operation of the machine, as it is being pushed forward over the row of potatoes the plants are guided in between the pans 37 by guiding fingers 56. As the plants approach the rapper frame, which rotates very rapidly, they are quite violently shaken toward either side and brushed off by either the lashes or brushes as described, with the result that the bugs are thrown into the poisonous liquid 38 and destroyed.

It is understood that various modifications may be made in the form and construction of this machine and the various parts thereof, if such modifications are within the scope of and consistant with the following claims:

Having now therefore fully shown and described my invention what I claim to be new and desire to protect by Letters Patent is:

1. A machine of the class described consisting of a frame mounted on wheels, two adjusting members slidably secured one on each side of the front part of the frame on which they are transversely adjustable, two longitudinally positioned receiving pans positioned under the frame, inclined hangers pivotally connected at their upper ends to said adjusting members and adapted to support the rear ends of said pans with their lower rear ends, means for adjusting the inclination of said hangers, and means for adjustably suspending the front ends of said pans, a rapping frame rotatably mounted above the space between the two pans and means for actuating the same.

2. A machine of the class described consisting of a frame mounted on wheels, a receiving pan positioned longitudinally beneath the frame, means for knocking plants toward said pan, a transversely movable adjusting member secured near one side of the front end of the frame, an inclined hanger pivotally connected at its upper end to said adjusting member and having its lower rear end pivotally connected to the rear end of the receiving pan, and means for yieldingly suspending the front end of the pan from the frame.

In testimony whereof I affix my signature.

WALTER A. JOHNSON.